United States Patent
Storz

(10) Patent No.: US 11,518,846 B2
(45) Date of Patent: Dec. 6, 2022

(54) ACCELERATOR COMPOSITION FOR THE CURE OF POLYFUNCTIONAL ISOCYANATES WITH EPOXY RESINS

(71) Applicant: Huntsman Advanced Materials Licensing (Switzerland) GmbH, Basel (CH)

(72) Inventor: Christof Storz, Basel (CH)

(73) Assignee: Huntsman Advanced Materials (Switzerland) GmbH, Basel (CH)

( * ) Notice: Subject to any disclaimer, the term of this patent is extended or adjusted under 35 U.S.C. 154(b) by 0 days.

(21) Appl. No.: 17/052,543

(22) PCT Filed: May 13, 2019

(86) PCT No.: PCT/EP2019/062208
§ 371 (c)(1),
(2) Date: Nov. 3, 2020

(87) PCT Pub. No.: WO2019/219608
PCT Pub. Date: Nov. 21, 2019

(65) Prior Publication Data
US 2021/0238343 A1 Aug. 5, 2021

(30) Foreign Application Priority Data
May 16, 2018 (EP) ..................... 18172547

(51) Int. Cl.
*C08G 59/72* (2006.01)
*B01J 31/02* (2006.01)
(Continued)

(52) U.S. Cl.
CPC .......... *C08G 59/72* (2013.01); *B01J 31/0239* (2013.01); *B01J 31/0268* (2013.01);
(Continued)

(58) Field of Classification Search
CPC .. B01J 31/0239; B01J 31/0268; B01J 31/146; C08G 18/003; C08G 59/4028; C08G 2650/36; C08G 59/72
(Continued)

(56) References Cited

U.S. PATENT DOCUMENTS 3,979,365 A 9/1976 Tanaka et al.
4,131,600 A 12/1978 Ihlein et al.
(Continued)

FOREIGN PATENT DOCUMENTS

EP 0129787 A2 1/1985
EP 0129799 A2 1/1985
(Continued)

OTHER PUBLICATIONS

Lee, H. and Neville, K. "Handbook of Epoxy Resins", McGraw-Hill Book Company, New York, 1967, Chapter 2, contents.

*Primary Examiner* — David T Karst
(74) *Attorney, Agent, or Firm* — Huntsman Advanced Materials (Switzerland) GmbH

(57) ABSTRACT

The present disclosure is related to an accelerator composition for the cure of polyfunctional isocyanates with epoxy resins comprising (a) a boron trihalide-amine complex, and (b) a quaternary ammonium or phosphonium halide as well as the use of such accelerator composition, cured isocyanate-epoxy resin products obtainable therefrom and a method of making a cured isocyanate-epoxy resin product.

10 Claims, 1 Drawing Sheet

(51) Int. Cl.
    *C08G 18/00*     (2006.01)
    *C08G 59/40*     (2006.01)
    *B01J 31/14*     (2006.01)

(52) U.S. Cl.
    CPC .......... *B01J 31/146* (2013.01); *C08G 18/003* (2013.01); *C08G 59/4028* (2013.01); *C08G 2650/36* (2013.01)

(58) Field of Classification Search
    USPC .......................................................... 528/89
    See application file for complete search history.

(56) References Cited

U.S. PATENT DOCUMENTS

| | | |
|---|---|---|
| 4,698,408 A | 10/1987 | Goel et al. |
| 2012/0010328 A1 | 1/2012 | Swiatkowski |

FOREIGN PATENT DOCUMENTS

| | | |
|---|---|---|
| EP | 0129800 A2 | 1/1985 |
| EP | 0130454 A2 | 1/1985 |
| WO | 2012099149 A | 7/2012 |

ACCELERATOR COMPOSITION FOR THE CURE OF POLYFUNCTIONAL ISOCYANATES WITH EPOXY RESINS

CROSS-REFERENCE TO RELATED APPLICATIONS

This application is the National Stage application filed under 35 U.S.C. § 371 of International Application No. PCT/EP2019/062208 filed May 13, 2019 which designated the United States and which claims priority to European App. Serial No. 18172547.4 filed May 16, 2018. The noted applications are incorporated herein by reference in their entirety.

TECHNICAL FIELD

The present disclosure is related to an accelerator composition for the cure of polyfunctional isocyanates with epoxy resins.

BACKGROUND

The cure of thermosets based on polyfunctional isocyanates with standard mono- or polyfunctional epoxy resins is usually too slow to be used in industrial applications.

Several accelerators or catalysts have been developed to accelerate the cure of isocyanates with epoxy resins. Examples are described in U.S. Pat. No. 4,131,600; EP 0 129 787 A2; EP 0 129 799 A2; EP 0 129 800 A2; and EP 0 130 454 A2.

However, even with the use of the known accelerator systems, the demold time of polyfunctional isocyanates with standard epoxy resins at moderate cure temperatures of about 90° C. to 120° C. still remains relatively slow in the range of 15 minutes to one hour.

OBJECT OF THE DISCLOSURE

Known accelerator systems are too slow to make an isocyanate-epoxy resin system that demolds quickly in the desired range of several minutes at moderate cure temperatures of about 90° C. to 120° C. and has a low post-cure temperature for use in industrial applications. It is therefore the object of the present disclosure to develop an improved accelerator composition which would accelerate the pre-cure without building up viscosity too quickly thus allowing the mold to be filled, while maintaining the post-cure unchanged.

DISCLOSURE

Figure 1:
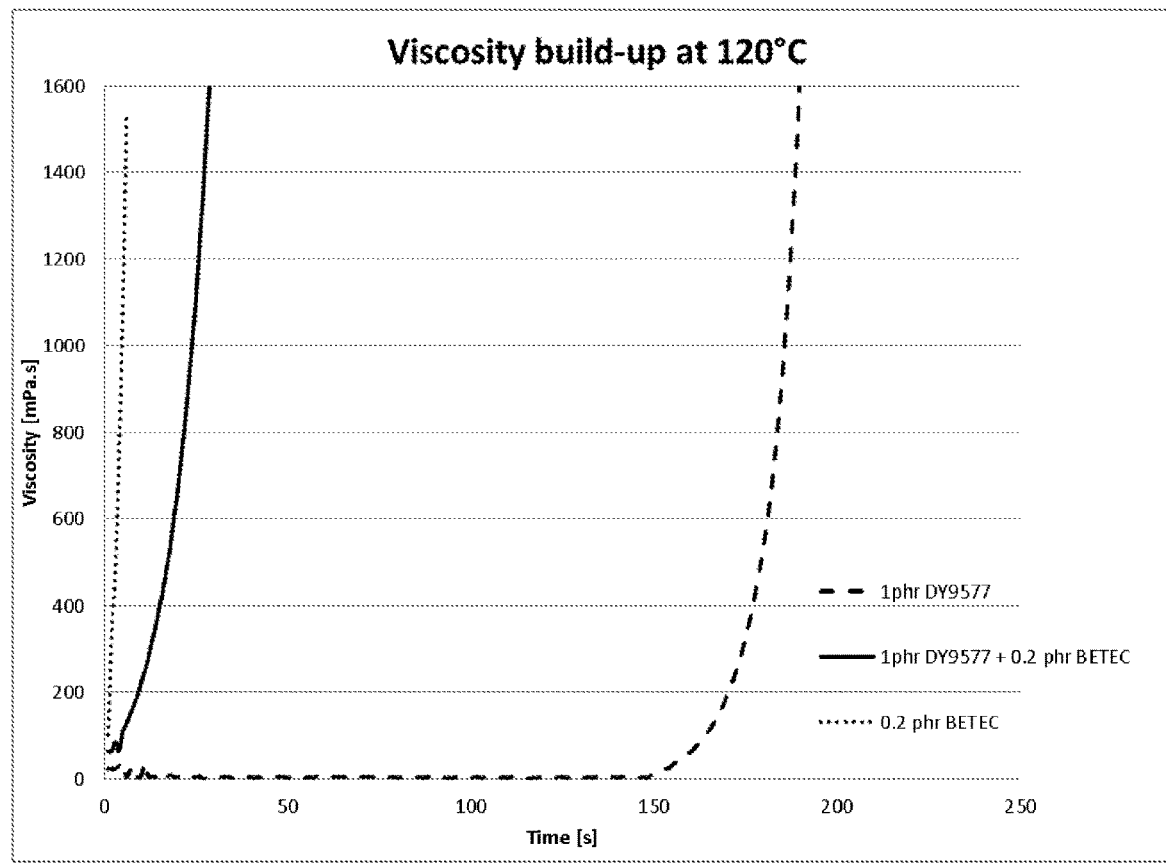
FIG. 1 shows viscosity build-up curves for three accelerated systems obtained by using a Brookfield Viscometer.

Unless otherwise defined herein, technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference to the extent that they do not contradict the instant disclosure.

All of the compositions and/or methods disclosed herein can be made and executed without undue experimentation in light of the present disclosure. While the compositions and methods of the present disclosure have been described in terms of preferred embodiments, it will be apparent to those having ordinary skill in the art that variations may be applied to the compositions and/or methods and in the steps or sequences of steps of the methods described herein without departing from the concept, spirit, and scope of the present disclosure. All such similar substitutes and modifications apparent to those skilled in the art are deemed to be within the spirit, scope, and concept of the present disclosure.

As utilized in accordance with the present disclosure, the following terms, unless otherwise indicated, shall be understood to have the following meanings.

The use of the word "a" or "an", when used in conjunction with the term "comprising", "including", "having", or "containing" (or variations of such terms) may mean "one", but it is also consistent with the meaning of "one or more", "at least one", and "one or more than one".

The use of the term "or" is used to mean "and/or" unless clearly indicated to refer solely to alternatives and only if the alternatives are mutually exclusive.

Throughout this disclosure, the term "about" is used to indicate that a value includes the inherent variation of error for the quantifying device, mechanism, or method, or the inherent variation that exists among the subject(s) to be measured. For example, but not by way of limitation, when the term "about" is used, the designated value to which it refers may vary by plus or minus ten percent, or nine percent, or eight percent, or seven percent, or six percent, or five percent, or four percent, or three percent, or two percent, or one percent, or one or more fractions therebetween.

The use of "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it refers. In addition, the quantities of 100/1000 are not to be considered as limiting since lower or higher limits may also produce satisfactory results.

As used herein, the words "comprising" (and any form of "comprising", such as "comprise" and "comprises"), "having" (and any form of "having", such as "have" and "has"), "including" (and any form of "including", such as "includes" and "include") or "containing" (and any form of "containing", such as "contains" and "contain") are inclusive or open-ended and do not exclude additional, unrecited elements or method steps.

The phrases "and mixtures thereof", "or combinations thereof" and "and combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms such as BB, AAA, CC, AABB, AACC, ABCCCC, CBBAAA, CABBB, and so forth. The skilled artisan will understand that typically there is no limit on the number of items or terms in any combination, unless otherwise apparent from the context. In the same light, the terms "or combinations thereof" and "and combinations thereof" when used with the phrases "selected from" or "selected from the group consisting of" refers to all permutations and combinations of the listed items preceding the phrase.

The phrases "in one embodiment", "in an embodiment", "according to one embodiment", and the like generally mean the particular feature, structure, or characteristic following the phrase is included in at least one embodiment of the present disclosure, and may be included in more than one embodiment of the present disclosure. Importantly, such phrases are non-limiting and do not necessarily refer to the same embodiment but, of course, can refer to one or more preceding and/or succeeding embodiments. For example, in the appended claims, any of the claimed embodiments can be used in any combination.

The present disclosure is related to an accelerator composition for curing polyfunctional isocyanates with epoxy resins comprising
(a) a boron trihalide-amine complex, and
(b) a quaternary ammonium or phosphonium halide.

The present disclosure is also related to a method of making a cured isocyanate-epoxy resin product by combining:
a polyfunctional isocyanate;
an epoxy resin; and
an accelerator composition comprising
(a) a boron trihalide-amine complex, and
(b) a quaternary ammonium or phosphonium halide.

Component (a), the boron trihalide-amine complex, is a temperature latent cure accelerator for isocyanate-epoxy resin systems which is activated at temperatures of around 90 to 120° C. to lead to moderate pre-cure times (slow formation of isocyanurates) and a very good catalyst for reducing the post-cure temperature of such systems (fast oxazolidone formation). On the other hand, component (b), the quaternary ammonium or phosphonium halide, is a very fast cure accelerator for isocyanate-epoxy resin systems at temperatures below 100° C. (fast formation of isocyanurates), but a bad catalyst to reduce the post-cure temperature of such systems (slow oxazolidone formation).

Surprisingly, it has now been found that the accelerator composition of the present disclosure shows a significant synergistic effect on the pre-cure times of polyfunctional isocyanates with epoxy resins at temperatures of about 90° C. to 120° C. to be now in the range of only several minutes, without negatively affecting the post-cure time.

Most preferably, component (a) is a boron trichloride-dimethyloctylamine complex, boron trichloride-trimethylamine complex, boron trichloride-benzyldimethylamine complex or mixtures thereof.

Most preferably, component (b) is benzyltriethylammonium chloride, tetrabutylammonium chloride, tetrabutylammonium bromide, tetrabutylphosphonium chloride, tetrabutylphosphonium bromide or mixtures thereof.

In a preferred embodiment of this disclosure, the weight ratio of component (a) to component (b) is in the range from about 50:1 to 1:1.

Most preferably, the weight ratio of component (a) to component (b) is about 20:1 to 5:1.

The present disclosure is also related to the use of an accelerator composition according to this disclosure for the cure of polyfunctional isocyanates with epoxy resin.

Any polyfunctional isocyanate suitable for the cure with standard epoxy resins can be used. Examples are aliphatic polyisocyanates such as hexamethylene-1,6-diisocyanate, 2,2,4- or 2,4,4-trimethylhexamethylene-1,6-diisocyanate; alicyclic polyisocyanates such as cyclohexane-1,4-diisocyanate, dicyclohexylmethane-4,4'-diisocyanate; aromatic polyisocyanates such as p-phenylene diisocyanate, tolylene-2,4- or -2,6-diisocyanate, diphenylmethane-2,4- or -4,4'-diisocyanate, naphthylene-1,5-diisocyanate, xylylene-1,3- or -1,4-diisocyanate, polyphenylene polymethylene polyisocyanates; and mixtures thereof. It is also possible to use diphenylmethane diisocyanates containing a carbodiimide group or uretonimide group or modified polyisocyanates containing an allophanate group, urethane group, biuret group and/or urethidione group. Isocyanate based prepolymers obtained by reaction of an excess of the above mentioned polyisocyanates with polyols can also be employed.

Preferably, the polyfunctional isocyanate is selected from the group consisting of diphenylmethane-2,4- or -4,4'-diisocyanate; polyphenylene polymethylene polyisocyanate; diphenylmethane diisocyanates containing a carbodiimide group or uretonimide group; modified polyisocyanates containing an allophanate group, urethane group, biuret group and/or urethidione group; isocyanate based prepolymers obtained by reaction of an excess of the above mentioned polyisocyanates with polyols; and mixtures thereof.

The present disclosure is also related to a cured isocyanate-epoxy resin product obtainable by the use according to this disclosure.

The accelerator or curing compositions of the present disclosure may be used with any appropriate epoxy resin. The epoxy resins may be monomeric, oligomeric or polymeric compounds. Moreover, the epoxy resin may be aliphatic, cycloaliphatic, aromatic, cyclic, heterocyclic or mixtures thereof. Also, the epoxy resin may be saturated or unsaturated, substituted or unsubstituted or mixtures thereof. A list of epoxy resins useful for the cure with the accelerator or curing compositions of the present disclosure can be found in Lee, H. and Neville, K. "Handbook of Epoxy Resins", McGraw-Hill Book Company, New York, 1967, Chapter 2, pages 257-307.

A few non-limiting examples of useful epoxy resins are epoxides prepared from the reaction of epihalohydrins and polyglycols, such as trimethylpropane epoxide; diglycidyl-1,2-cyclohexane dicarboxylate, bisphenol-A-diglycidylether, bisphenol-F-diglycidylether; resorcinol diglycidylether; triglycidylethers of para-aminophenols, halogen-containing epoxy resins, such as diglycidylether of tetrabromobisphenol-A; epoxidized phenol novolac; and mixtures thereof.

Details can be seen from the following examples.

EXAMPLES

A polyfunctional isocyanate based on a mixture of diphenylmethane-2,4- and -4,4'-diisocyanate and their prepolymers with polyols (SUPRASEC® 2644 isocyanate available from Huntsman Corp. or an affiliate thereof) together with a standard epoxy resin based on bisphenol-A-diglycidylether (ARALDITE® GY 250 epoxy resin available from Huntsman Corp. or an affiliate thereof) in a stoichiometry of 3.6 isocyanate groups to 1 epoxy group (100 parts by weight SUPRASEC® 2644 isocyanate, 25.0 parts by weight ARALDITE® GY 250 epoxy resin) was investigated using Differential Scanning Calorimetry (DSC) to determine the curing behavior, Gelnorm Gel-Timer to determine the gel-time and Brookfield Viscometer to determine the viscosity build-up during cure. Boron trichloride-dimethyloctylamine complex (Accelerator DY 9577 available from Huntsman Corp. or an affiliate thereof), benzyltriethylammonium chloride ("BETEC") (available from TCI-Chemicals) and the mixture of both compounds were investigated as the accelerator species.

As used herein, "phr" means parts by weight per hundred parts by weight isocyanate.

Three different accelerator systems were evaluated:
Comparative 1: 1 phr DY 9577
Comparative 2: 0.2 phr BETEC
Example 1: 1 phr DY 9577+0.2 phr BETEC The accelerator composition of Example 1 according to the present disclosure shows an unexpected synergistic acceleration effect on the pre-cure compared to Comparative 1 (DY 9577 only accelerated system) without exhibiting the very fast gelation of Comparative 2 (BETEC only accelerated system) (see Table 1, FIG. 1).

Table 1 shows accelerator screening followed by DSC, Gelnorm Gel-Timer and Brookfield Viscometer (System: 100 phr SUPRASEC® 2644 isocyanate/25.0 phr ARALDITE® GY 250 epoxy resin).

TABLE 1

| Example | Accelerator | Amount (phr) | Viscosity build-up time (time to 100 mPa*s) at 120° C. using Brookfield Viscometer (s) | Gel time at 120° C. using Gelnorm Gel-Timer (s) | Maximum peak temperature in dynamic cure (5K/min) after isothermal cure at 120° C. for 20 min. using DSC (° C.) |
|---|---|---|---|---|---|
| Comp 1 | DY 9577 | 1 | 186 | 310 | 168 |
| Comp 2 | BETEC | 0.2 | 4 | 29 | 182 and 265 |
| Ex 1 | DY 9577 + BETEC | 1 + 0.2 | 30 | 80 | 175 |

FIG. 1 shows viscosity build-up curves for the three accelerated systems obtained by using a Brookfield Viscometer, wherein the dotted curve shows the accelerated system with 0.2 phr BETEC (Comparative 2), the dashed curve the accelerated system with 1 phr DY 9577 (Comparative 1), and the straight curve the accelerated system of the present disclosure with 0.2 phr BETEC and 1 phr DY 9577 (Example 1).

The gel time followed by Gelnorm Gel-Timer as well as the viscosity build-up time (time to 100 mPa*s) followed by Brookfield Viscometer of the accelerator composition of the present disclosure is in between the systems catalyzed only with the single accelerator species. Taking the results of both measurements into consideration, it can be concluded that the accelerator composition is not only working in an additive way but in an unexpected synergistic manner.

Figure 2:
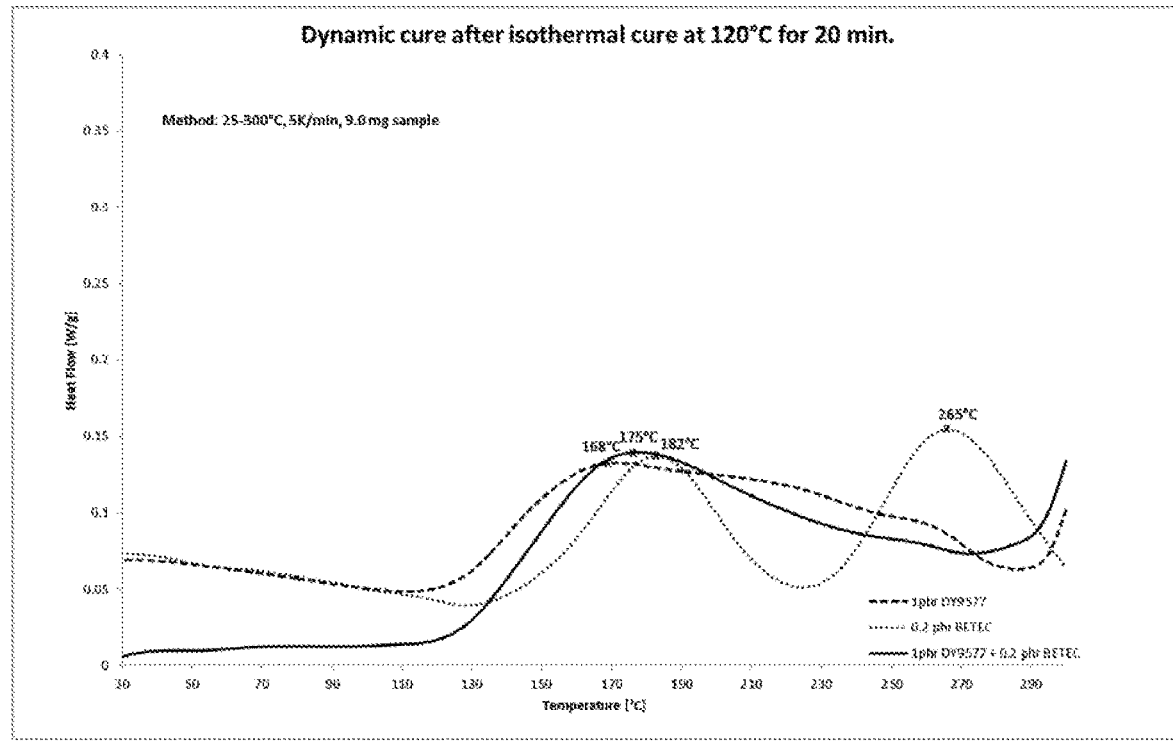
FIG. 2 shows the dynamic cure for three accelerated systems after isothermal cure at 120° C. in 20 minutes using Differential Scanning Calorimetry (DSC).

Additionally the post-cure time remains unchanged (see Table 1, FIG. 2).

FIG. 2 shows the dynamic cure of the three accelerated systems after isothermal cure at 120° C. in 20 minutes using DSC, wherein the dotted curve shows the accelerated system with 0.2 phr BETEC (Comparative 2), the dashed curve the accelerated system with 1 phr DY 9577 (Comparative 1), and the straight curve the accelerated system of the present invention with 0.2 phr BETEC and 1 phr DY 9577 (Example 1).

Dynamic cure (5K/min) after isothermal cure at 120° C. for 20 minutes using DSC reveals that the post-cure time of Example 1 is very similar to that of Comparative 1 (DY 9577 accelerated system). The DSC curves for Example 1 and Comparative 1 show a very similar trend a have similar maximum peak temperatures around 168-175° C. The BETEC catalyzed system, on the other hand, shows a maximum peak temperature at 182° C. as well as a second peak shifted towards a significant higher temperature range with a maximum peak temperature at 265° C., suggesting a much longer post-cure time.

Table 2 shows accelerator screening of different quaternary ammoniums/phosphonium halides followed by Gelnorm Gel-Timer and Brookfield Viscometer (System: 100 phr SUPRASEC® 2644 isocyanate/25.0 phr ARALDITE® GY 250 epoxy resin).

TABLE 2

| Example | Accelerator | Amount (phr) | Viscosity build-up time (time to 100 mPa * s) at 120° C. using Brookfield Viscometer (s) | Gel time at 120° C. using Gelnorm Gel-Timer (s) |
|---|---|---|---|---|
| Comp 1 | DY 9577 | 1 | 186 | 310 |
| Comp 2 | BETEC | 0.2 | 4 | 29 |
| Ex 1 | DY 9577 + BETEC | 1 + 0.2 | 30 | 80 |
| Comp 3 | Tetrabutyl-phosphonium bromide | 0.2 | 8 | 51 |
| Ex 2 | DY 9577 + Tetrabutyl-phosphonium bromide | 1 + 0.2 | 52 | 152 |
| Comp 4 | Tetrabutyl-ammonium bromide | 0.2 | 6 | 40 |
| Ex 3 | DY 9577 + Tetrabutyl-ammonium bromide | 1 + 0.2 | 43 | 125 |
| Comp 5 | Tetrabutyl-phosphonium chloride | 0.2 | 7 | 44 |
| Ex 4 | DY 9577 + Tetrabutyl-phosphonium chloride | 1 + 0.2 | 45 | 135 |
| Comp 6 | Tetrabutyl-ammonium chloride | 0.2 | 5 | 38 |
| Ex 5 | DY 9577 + Tetrabutyl-ammonium chloride | 1 + 0.2 | 42 | 95 |

Table 2 further shows the unexpected synergism of using the composition disclosed in the present disclosure, i.e., component (a), a boron trihalide-amine complex, with component (b), a quaternary ammonium or phosphonium halide. The gel time as well as the viscosity build-up time (time to 100 mPa*s) of the accelerator composition of the present disclosure is in between the systems catalyzed only with the single accelerator species.

The experiments show that, because of the latency of component (a) it is very challenging to have fast pre-cure times (fast demold times) for isocyanate-epoxy resin systems at low temperatures below 120° C. The use of component (b) alone yields a pre-cure that is too fast, making it unsuitable for use in an infusion process, such as Resin Transfer Molding (RTM), Wet Compression Molding (WCM) or vacuum infusion, and, due to the bad acceleration effect for the oxazolidone formation, post-cure temperatures are much higher compared to component (a).

Surprisingly, it has now been shown that, when component (b), a quaternary ammonium or phosphonium halide, is added to an isocyanate-epoxy resin system which is accelerated by component (a), a boron trihalide-amine complex, the pre-cure can be accelerated without having the fast gelation time when the same amount of component (b) is used alone, and the post-cure time remains unchanged. Such synergistic effect of the mixture of these two components was completely unforeseeable and surprising.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. An accelerator composition for curing polyfunctional isocyanates with epoxy resins comprising
   (a) a boron trichloride-amine complex, and
   (b) a quaternary phosphonium halide.

2. The composition according to claim 1, wherein component (a) is a boron trichloride-dimethyloctylamine complex, boron trichloride-trimethylamine complex, boron trichloride-benzyldimethylamine complex or mixtures thereof.

3. The composition according to claim 1, wherein component (b) is a quaternary or phosphonium bromide or chloride.

4. The composition according to claim 3, wherein component (b) is tetrabutylphosphonium chloride, tetrabutylphosphonium bromide or mixtures thereof.

5. The composition according to claim 1, wherein the weight ratio of component (a) to component (b) is in the range from about 50:1 to 1:1.

6. The composition according to claim 5, wherein the weight ratio of component (a) to component (b) is about 20:1 to 5:1.

7. An accelerator composition for curing polyfunctional isocyanates with epoxy resins comprising
   (a) a boron trihalide-amine complex, and
   (b) a quaternary ammonium or phosphonium halide and wherein the weight ratio of component (a) to component (b) is about 20:1 to 5:1.

8. The composition according to claim 7, wherein component (a) is a boron trichloride-dimethyloctylamine complex, boron trichloride-trimethylamine complex, boron trichloride-benzyldimethylamine complex or mixtures thereof.

9. The composition according to claim 7, wherein component (b) is a quaternary ammonium or phosphonium bromide or chloride.

10. The composition according to claim 9, wherein component (b) is benzyltriethylammoniumchloride, tetrabutylammoniumchloride, tetrabutylammonium bromide, tetrabutylphosphonium chloride tetrabutylphosphonium bromide or mixtures thereof.

* * * * *